No. 830,873. PATENTED SEPT. 11, 1906.
L. H. BARRY.
CUSHION TIRE FOR VEHICLE WHEELS.
APPLICATION FILED OCT. 11, 1905.
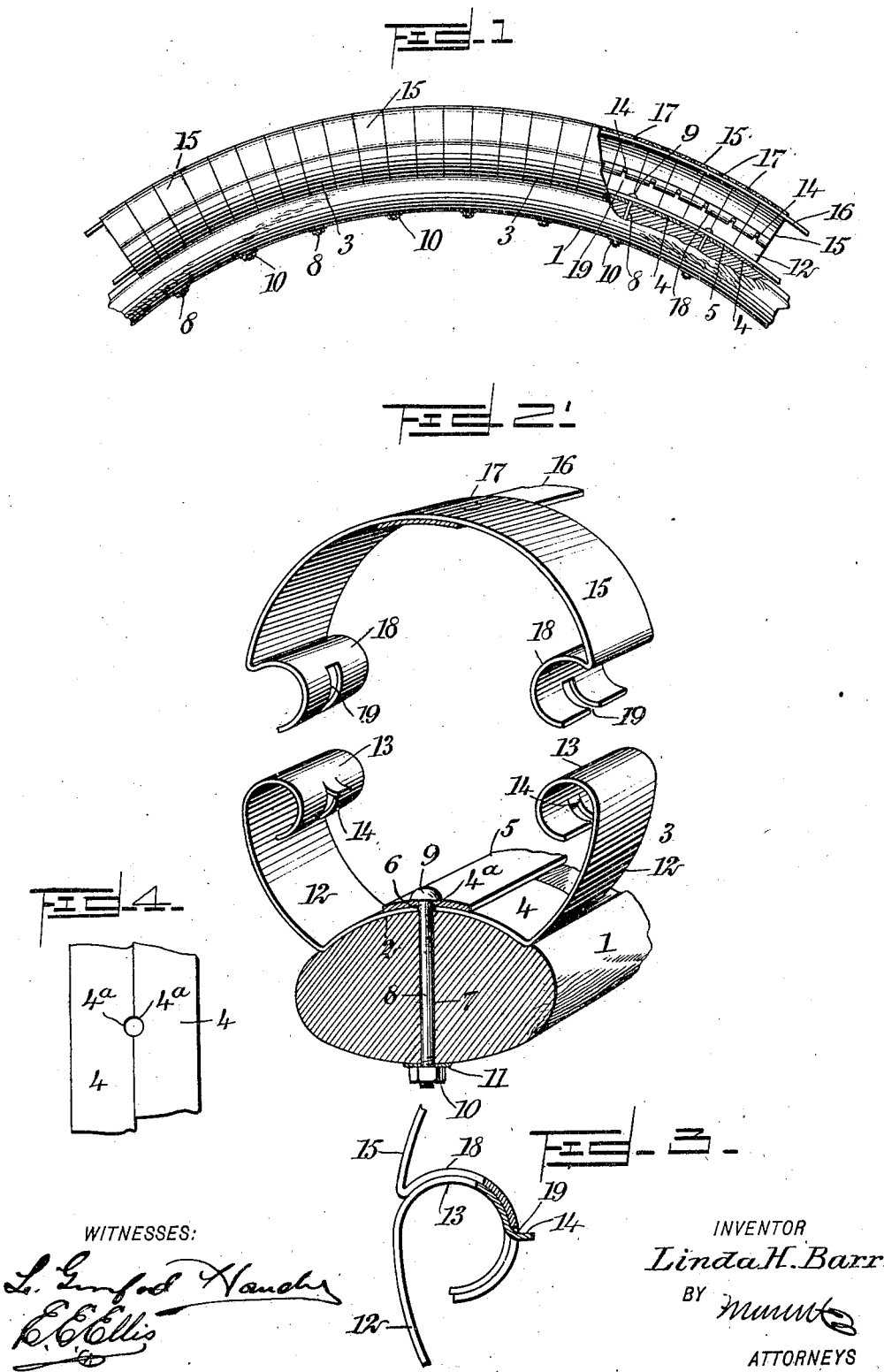
WITNESSES:
INVENTOR
Linda H. Barry
BY
ATTORNEYS

UNITED STATES PATENT OFFICE.

LINDA HENRY BARRY, OF DURANGO, MEXICO.

CUSHION-TIRE FOR VEHICLE-WHEELS.

No. 830,873.  Specification of Letters Patent.  Patented Sept. 11, 1906.

Application filed October 11, 1905. Serial No. 282,354.

*To all whom it may concern:*

Be it known that I, LINDA HENRY BARRY, a citizen of the United States, and a resident of Durango, in the Republic of Mexico, have invented a new and Improved Cushion-Tire for Vehicle-Wheels, of which the following is a full, clear, and exact description.

This invention relates to cushion-tires for the wheels of vehicles, as bicycles and the like; and it consists, substantially, in the details of construction and combinations of parts hereinafter more particularly described, and pointed out in the claims.

The invention has reference more especially to cushion-tires technically designated as "metallic," and one of the principal objects thereof is to provide a tire of this kind of an embodiment to overcome numerous disadvantages and objections encountered in the use of many other structures of the kind hitherto devised.

A further object is to provide a metallic cushion-tire which is simple in construction, and comparatively inexpensive to manufacture, besides being thoroughly effective and reliable for its purpose and possessing the capacity for long and repeated service.

The above-mentioned and additional objects are attained by means substantially such as are illustrated in the accompanying drawings, in which—

Figure 1 is a part-sectional side view of a portion of a wheel rim or felly having applied thereto a portion of a metallic cushion-tire embodying my improvements. Fig. 2 is an enlarged view in perspective illustrating in disconnected relation to each other one of each of two sets of metallic springs employed in the construction of my improved tire and also showing a portion of a wheel-rim in section and part of the means by which the springs of one set are secured to the wheel-rim. Fig. 3 is a part-sectional view in detail indicating the manner in which the springs of the two sets thereof are secured together to form the tire, and Fig. 4 is a small view in detail.

Before proceeding with a more detailed description it may be stated that in the form of my improvements herein shown I may employ a wheel rim or felly of special construction in direct association with the outer face of which I employ a set of directly-adjoining metallic springs of special construction, together with special means for securing the same to the rim. Connected to the said springs are the metallic springs of another set, also of special construction and directly adjoining each other, combined with which are special means for connecting them together continuously about the circumference of the rim by which to derive the desired cushioning effect as well as a uniform tread.

Reference being had to the drawings by the designating characters thereon, 1 represents a portion of the wheel rim or felly, the outer face 2 of which may be convex or outwardly curved transversely, as shown. Disposed on said outer face of the rim and occupying the full extent thereof is a set of metallic springs 3 of the desired resiliency or elasticity, the same closely adjoining each other, practically dirt and water tight, and each comprising a base member 4, which may be curved to closely fit a portion of the said outwardly-curved face 2 of the rim and the adjacent or opposite edges of pairs of which are formed with corresponding notches $4^a$, together forming a hole or opening, as shown in Fig. 4. Lying upon the outer face of all of said members is a circumferentially-disposed metallic ring-plate 5 of the desired resiliency or elasticity, having a hole or opening 6 therein corresponding with each hole or opening produced by the sets of said notches $4^a$, the rim 1 being also formed therethrough radially, with a hole or opening 7 corresponding with each of those in the said base members and ring-plate. Extending through the corresponding holes or openings referred to of each set is a bolt or pin 8, having a head 9 at its outer end and threaded for a suitable distance from its inner end, on which latter end a nut or other fastening 10 is applied and preferably, also, a washer 11.

Integral with the ends of the base member 5 of each spring 3 are outwardly-curved members 12, the extremities of which are bent or turned inwardly, as shown, to form arched seats 13, which are provided with inwardly-projecting tongues 14, formed, preferably, by slitting the seats from the ends thereof on parallel lines and bending the intermediate portions of metal in the proper direction.

Coöperating with the springs 3 is a set of metallic springs 15, each of which is curved outwardly in substantial concentricity with though of greater dimensions than the base member of the spring 3, with which the same is directly associated. Said springs 15 are connected together on their inner faces by means of another circumferentially-disposed metallic ring-plate 16 of the desired resiliency or elasticity, a rivet 17 being employed for fastening each of said springs thereto, as shown.

The ends of each spring 15 are bent or turned inwardly, as shown, to form arched feet 18, adapted to fit snugly upon the arched seats 13 of the associating spring 3, said feet being formed from the ends thereof with slots or notches 19, in which are received the tongues 14 from the said arched seats 13. In this way when the associating springs of the two said sets thereof are properly united or joined together a metallic cushion-tire is had, adapted for all the purposes for which pneumatic or rubber tires are ordinarily employed, as will be apparent.

As herein shown, the bolts or pins 8 are employed at intervals only of one for each pair of base members 4, alternating in either direction with a single base member minus any bolt or pin and which, as is apparent, will be retained in place by the said ring-plate 5. The bolts or pins may even be employed at fewer intervals, in which case a greater number of the base-plates may be retained in place by said ring-plate in the same way.

The tongue-fastenings between the associating springs of the two sets thereof prevent either lateral or circumferential displacement of the springs of either set, while the springs of the outer set unite in forming a uniform yieldable tread.

It will be further apparent that the outer face of the rim 1 may be either flat or concave transversely, in which case the base members 4 of the spring 3 will be constructed in correspondence therewith.

Having thus described my invention, I claim as new and desire to secure by Letters Patent—

1. A cushion-tire for vehicle-wheels comprising a series of semicircular springs arranged upon the rim of the wheel, the ends of the springs being bent inwardly to form a convex surface and provided with a stop, a second series of circular springs mounted on the first series, the ends of the springs being bent inwardly to form a concave surface for engaging the convex surface and provided with a notch for receiving the stop.

2. A cushion-tire for vehicle-wheels, comprising a series of semicircular metallic springs arranged upon the rim of the wheel, the ends of the springs being bent inwardly to form a convex surface and provided with a stop, means for fastening the springs to the rim, a second series of semicircular springs mounted upon the first series, the ends of said springs being bent inwardly to form a concave surface for engaging the convex surface, and provided with a notch for receiving the stop.

3. A cushion-tire for vehicle-wheels, comprising a series of semicircular springs arranged upon the rim of the wheel, the ends of the springs being bent inwardly to form a convex surface and provided with a stop, means for fastening the springs to the rim, comprising a ring-plate, and a second series of semicircular springs mounted upon the first series, the ends of the springs being bent inwardly to form a concave surface for engaging the convex surface, and provided with a notch for receiving the stop.

4. A cushion-tire for vehicle-wheels, comprising a series of semicircular springs arranged upon the rim of the wheel, the ends of the springs being bent inwardly to form a convex surface and provided with a stop, means for fastening the springs to the rim, comprising a ring-plate, a second series of semicircular springs mounted upon the first series, the ends of the springs being bent inwardly to form a concave surface for engaging the convex surface and provided with a notch for receiving the stop, and means for securing the second series to each other.

5. A cushion-tire for vehicle-wheels, comprising a series of springs having abutting edges and each having a base member for attachment to the rim of a wheel transversely thereto, another series of springs having abutting edges mounted upon those of the first series and secured thereto, a ring-plate secured to each of said second series, and a ring-plate and bolts and nuts for securing the ring-plate and bolts of the first series to the rim.

6. A cushion-tire for vehicle-wheels, comprising a series of directly-adjoining metallic springs having base members adapted for disposition upon the rim of the wheel transversely thereto, and also having curved members provided with seats, another series of directly-adjoining metallic springs mounted upon said seats and connected therewith, means for securing said base members to the rim, and means for connecting the springs of the second-named series together.

7. A cushion-tire for vehicle-wheels, comprising a series of directly-adjoining metallic springs having base members adapted for disposition upon the rim of the wheel transversely thereto, and also having outwardly-curved members provided with seats, another series of directly-adjoining metallic springs having feet mounted upon said seats and connected therewith, means for securing the base members to the rim, and means for connecting together the springs of said second-named series.

8. A cushion-tire for vehicle-wheels, comprising a series of directly-adjoining metallic springs having base members adapted for disposition upon the rim of the wheel transversely thereto, and also having curved members formed with arched seats and inwardly-projecting tongues, another series of directly-adjoining metallic springs having arched feet mounted on said seats, provided with slots in which said tongues are received, means for securing the base members to the rim, and means for connecting together the springs of said second-named series.

9. A cushion-tire for vehicle-wheels, comprising a series of directly-adjoining metallic springs having base members adapted for disposition upon the rim of the wheel transversely thereto, and also having curved members formed with arched seats, another series of directly-adjoining metallic springs having arched feet mounted upon said seats and connected therewith, a ring-plate and bolts and nuts for securing the base members to the rim, and a ring-plate and rivets for connecting together the springs of said second-named series.

10. A cushion-tire for vehicle-wheels, comprising a series of metallic springs having directly-adjoining base members adapted for disposition upon the rim of the wheel transversely thereto, and a ring-plate combined with bolts and nuts for securing the base members to the rim, pairs of said base members having opposite notches at adjacent ends thereof, to form holes for said bolts.

In testimony whereof I have signed my name to this specification in the presence of two subscribing witnesses.

LINDA HENRY BARRY.

Witnesses:
J. P. JANSON,
LUIS MENA.